United States Patent [19]

Moreau et al.

[11] Patent Number: 5,237,253
[45] Date of Patent: Aug. 17, 1993

[54] MANUAL CONTROL DEVICE FOR THE MOTOR-ASSISTED DISPLACEMENTS OF A MACHINE ELEMENT

[76] Inventors: Joel Moreau, Chemin de la Croix Blanche, Soucieu en Jarrest, 69510 Thurins (Rhone); Jean-Claude Boyer, Les Ecureuils 1, impasse de Soeurs, 69100 Villeurbanne (Rhone), both of France

[21] Appl. No.: 657,864

[22] Filed: Feb. 20, 1991

[30] Foreign Application Priority Data

Feb. 21, 1990 [FR] France .................. 90 02459

[51] Int. Cl.$^5$ .................................. G05B 11/01
[52] U.S. Cl. .................................. 318/628; 318/663; 74/471 XY
[58] Field of Search ............... 318/628, 663, 632, 649, 318/568.25, 578; 74/471 XY; 73/862.05; 364/474.37

[56] References Cited

U.S. PATENT DOCUMENTS

| | | | |
|---|---|---|---|
| 3,727,119 | 4/1973 | Hanley et al. | 318/568.25 |
| 4,281,561 | 8/1981 | Groskopfs | 74/471 XY |
| 4,348,634 | 0/1982 | David et al. | 74/471 XY |
| 4,611,156 | 9/1986 | Feichtinger | 318/632 |
| 4,795,942 | 1/1989 | Brandstetter | 73/862.05 X |
| 4,833,630 | 5/1989 | Braman et al. | 364/474.37 X |

FOREIGN PATENT DOCUMENTS

| | | |
|---|---|---|
| 0023864 | 9/1981 | European Pat. Off. . |
| 2275285 | 1/1976 | France . |
| WO86/01597 | 3/1986 | PCT Int'l Appl. . |
| 1511265 | 5/1978 | United Kingdom . |

*Primary Examiner*—William M. Shoop, Jr.

[57] ABSTRACT

A control for a device of the type comprising at least one electronic measuring head supported by a structure composed of several elements that are capable of being displaced along the three axes X, Y and Z driven by means of electric motors 12 to 14 having a speed regulator and a control means for supply circuits 12a to 14a of the above motors.

According to the invention, the manual control comprises at least one control assembly 20 mounted on an element of the structure and having a single lever for actuating a harness that detects the displacements of said lever by use of sensors 30 to 37 mounted thereon and convert the displacement into voltages a, b, c and d. The manual control being associated with a calculator that algebraically processes voltages a, b, c and d according to the three following formulas:

$$(a+b+c+d), (-a+b-c+d), (-a-b+c+d)$$

and delivers, in control circuits 12a to 14a, three voltages x2, y2 and z2 which correspond in value and direction to the displacements transmitted to the lever in the three directions X, Y and Z.

13 Claims, 5 Drawing Sheets

MANUAL CONTROL DEVICE FOR THE MOTOR-ASSISTED DISPLACEMENTS OF A MACHINE ELEMENT

BACKGROUND OF THE INVENTION

The invention relates to a manual control device for motorized displacements on three orthogonal axes of a machine element, such as the measuring head of a three-dimensional measuring machine.

Three types of three-dimensional measuring machines are currently known, namely manual displacement machines, motorized displacement machines, and motorized displacement, numerical-control machines.

Manual machines have the advantage of being very user-friendly and convenient to use since they are guided by the operator's hand. On the other hand they are slow because they use the same procedure consisting firstly of rapidly and manually displacing the various structural elements while performing what is conventionally referred to as the approach movement. Then, after stopping and locking each of these elements, causing each of the elements to advance by means of a micrometer screw until the measuring head contacts the part to be measured, the micrometer screw movement corresponding to a sensing movement.

This procedure provides very attractive levels of measurement precision, if only because the machine is at rest when sensing.

Skilled operators use these manual displacement machines to perform sensing on the fly, in other words, following the approach movement by the sensing movement. Under these conditions, they take the risk of damaging the electronic measuring head which is very expensive and especially of losing the benefit of the measuring accuracy since in the latter case they must take into account the considerable errors related to the dynamic defects in the mechanical structure of the machine. These defects are all the more difficult to overcome because they depend primarily on the more or less rough fashion in which the operator controls the machine.

Motorized machines, or those in which the displacements of the structural elements are produced by electric motors with a speed control, have the advantage of being slightly faster than manual machines, since they use on-the-fly sensing, while maintaining good measuring precision, since the forces required for displacement are always applied in the same way, and because it is possible to control the operating speed during sensing. The electric motors which produce the displacements of the structural elements are controlled by two optoelectronic or electromechanical levers, one of which is assigned to displacements in the horizontal plane and the other to displacements in the vertical plane. The manipulation of these two levers is not instinctive, making the maneuver difficult and imposing a psychological burden which distracts the operator from his measuring. Thus, it often happens that operators have no interest in this type of machine and prefer to use a numerical control machine which is much more expensive.

European Patent Application 23864 describes a manual control device in which the motorized element is controlled by electrical signals delivered by sensors detecting the deformations of deformable strips, the strips being crossed and actuated by a lever. Because of their structure, the deformable strips have a high flexural strength and an even greater torsional strength, making it necessary to provide expensive and complicated means to suppress the effect on the sensors produced by the parasitic forces on the control lever.

The stiffness of the device acts against its application to a three-dimensional measuring machine which requires control means whose operation must be flexible, gradual, and gentle, in order not to directly influence the motorized element and consequently the measurement precision.

SUMMARY OF THE INVENTION

A goal of the present invention is to overcome these disadvantages by providing a control device, especially for a three-dimensional measuring machine with motorized displacements, which makes it possible, employing an action which is manual, instinctive, and has no effect on measurement precision, to control the motorized displacements of the structure by monitoring the speed of these displacements between a zero value and the maximum value of the approach speed. In other words, the invention provides a measuring machine which is less expensive than numerical control machines and as userfriendly as manual control machines while providing high measurement precision.

DESCRIPTION OF PREFERRED EMBODIMENTS

According to the invention, the control assembly comprises means for holding the ends of two elastic strips, the strips possessing considerable flexibility and low torsional stiffness. The strips are coplanar, parallel, spaced, and linked by a rigid cross member from which the operating lever projects. The control assembly further comprises fixed sensors, on opposite sides of the ends of the cross member and on each of the surfaces of each strip, forming four pairs of sensors, and electrical connecting circuits linking the sensors of each pair by wiring them in parallel on two arms of a common Wheatstone bridge, A, B, C and D respectively, while the output circuit from each Wheatstone bridge in which a voltage a, b, c or d flows, is connected to means for algebraically processing voltages a, b, c, and d according to the following three formulas:

$(a+b+c+d)$,     1

$(-a+b-c+d)$,     2

$(-a-b+c+d)$,     3 to deliver to control circuits of three electric motors for displacing the element, three voltages $x2$, $y2$ and $z2$ corresponding in value and direction to the displacements transmitted to the lever in the three directions X, Y and Z.

To displace the structural elements of the machine, it is sufficient to grasp the control lever and move it, in the same direction and by the same amount relative to the three axes X, Y and Z, as would an operator wishing to displace manually the structural elements to bring the measuring head in contact with the part to be measured. Under the influence of this movement, the sensors associated with means for detecting the movements deliver four voltages a, b, c, and d which are processed algebraically to supply three output voltages whose value and direction are functions of the desired movements on the three axes X, Y and Z. These three output voltages act on the control units of electric motors with speed controls to drive the structural elements on the three axes.

Thus, by means of this device, employing an instinctive manual action on the single operating lever, it is possible to assist, perfectly and with precision, the displacements of each of the structural elements.

In one embodiment of the invention, the means processing voltages a, b, c, and d comprise an analogdigital converter, which transforms each of these voltages into digital signals, $a1$, $b1$, $c1$, $d1$ respectively. The digital signals are passed to a calculator that algebraically processes the four received signals $(a1+b1+c1+d1)$,     1

$(-a1+b1-c1+d1)$,     2

$(-a1-b1+c1+d1)$,     3 and delivers three digital signals $x1$, $y1$, $z1$ corresponding in value and sign to the displacements in the three directions X, Y and Z transmitted to the lever to an analog-digital converter which, transforming these three signals into voltages $x2$, $y2$, and $z2$, is connected between the output of the calculator and the control circuits of the electric motors for displacing the structure.

This arrangement, which employs simple commercial devices, facilitates the algebraic processing of the signals and guarantees the speed and precision of the measurement.

In one embodiment, the operating assembly is provided with stops cooperating with the strips so that beyond a deformation threshold, their resistance is increased and a sensitivity threshold is formed beyond which the speeds with which the elements are displaced switch from a slow sensing speed range to a fast approach speed range.

Thus, at the same time that the operator operates the lever, he is alerted, by the change in the resistance of the elastic strips, to the change in the speed mode and can therefore easily control the displacement speeds as required.

Similarly, the rigid cross member linking the two elastic strips of a control assembly is integral with stop bars which, when the strips are deformed, come in contact with the opposite stop faces of the assembly to limit this deformation and, at the same time, the value of the voltage transmitted to the control circuits of the electric motors.

Thanks to this arrangement, which opposes any deformation of the strips beyond a given threshold, the operator does not run the risk of damaging the strips and, more importantly, cannot cause the displacements of the structural elements at a speed greater than the maximum obtained when the strips undergo a deformation which is limited to the stop means.

Other characteristics and advantages will emerge from the description which follows and refers to the attached schematic diagram which shows as a nonlimiting example one embodiment of this manual control device for a three-dimensional measuring machine with motorized displacements.

Figure 1:
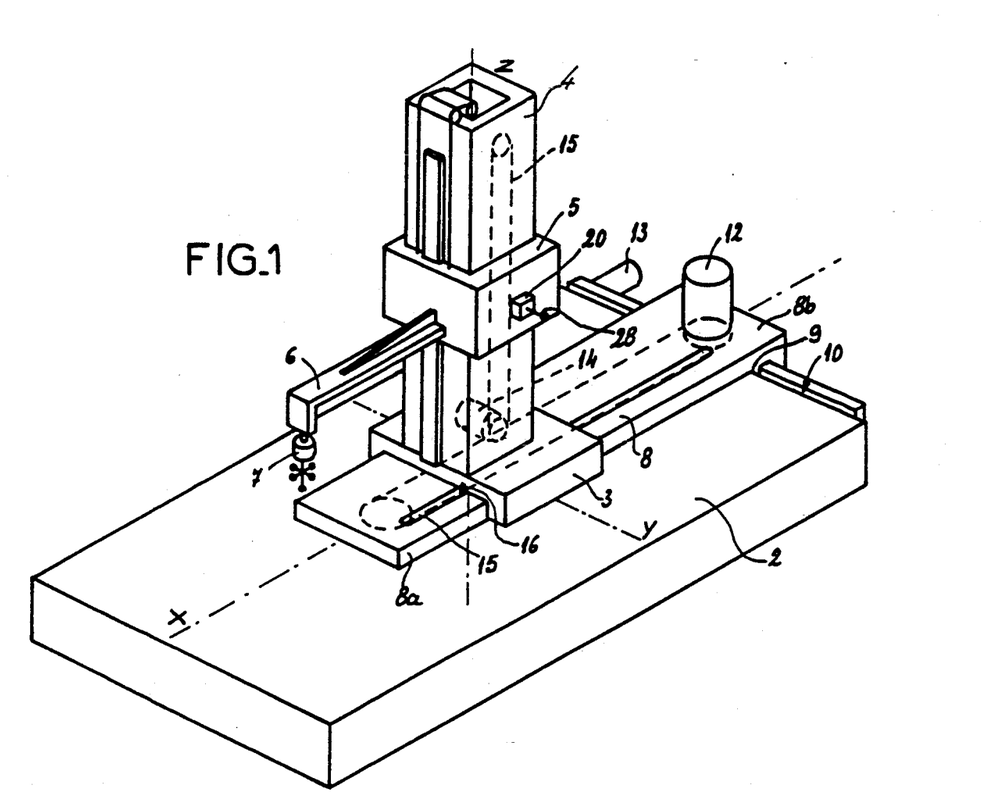
FIG. 1 is a perspective view showing schematically the general appearance of a coordinate measuring machine.

The measuring machine shown in FIG. 1 is composed of a marble slab 2 on which rests a vertical column 4 supported by an enlarged base 3. A slide 5 is slidably mounted on column 4, the slide having a horizontal sensing arm 6 at the free end of which electronic measuring head 7 is mounted. In known fashion, this head is connected to means for processing and correcting the electronic signals which it emits when it comes in contact with the part to be measured, the means being connected to a digital indicator showing the coordinates in three perpendicular directions X, Y, and Z of the point being measured.

The base 3 is slidably mounted on a lengthwise ruler 8, one of whose ends $8a$ is free while its other end $8b$ is integral with a slide 9. This slide is movable transverse to the slide's length in a groove 10 running along one edge of marble slab 2. As FIG. 1 shows, column 4 is guided in its longitudinal displacements on the X axis by ruler 8 and in its transverse displacements on the Y axis by slide 9 and groove 10. The manner in which the slide 5 is mounted on column 4 guides the vertical displacements along the Z axis. Elements 3, 4, 5, 8, 9 and 10 of the machine structure ensure, in known fashion, the precise guidance of these displacements. They can be assisted in these displacements by means of air bearings or by any other means.

Although the machine design is especially suitable, it is clear that the invention applies to measuring machines having a different structure, for example of a type with a movable frame, one with a fixed frame and an axially movable table, a type with a movable bridge, a type with a bracket, one with a movable cantilevered beam, or one of the upright plus movable arm type. Similarly, it applies to any other motorized machine element.

Regardless of the structure of the machine, it is essential that the displacements of these elements be motorized, in other words effected by means of electric motors 12, 13 and 14 at variable speeds and in adjustable rotational directions.

In the present machine, each motor is connected to a corresponding element, namely motor 12 to base 3, motor 13 to slide 9, and motor 14 to slide 5, by transmission means comprising a belt 15 connected at 16 to the driven element and forming a loop between a pulley locked to the shaft of the corresponding motor and a return pulley.

All of these devices are well known in the art and it is therefore not necessary to supply a more detailed description thereof.

Figure 11:
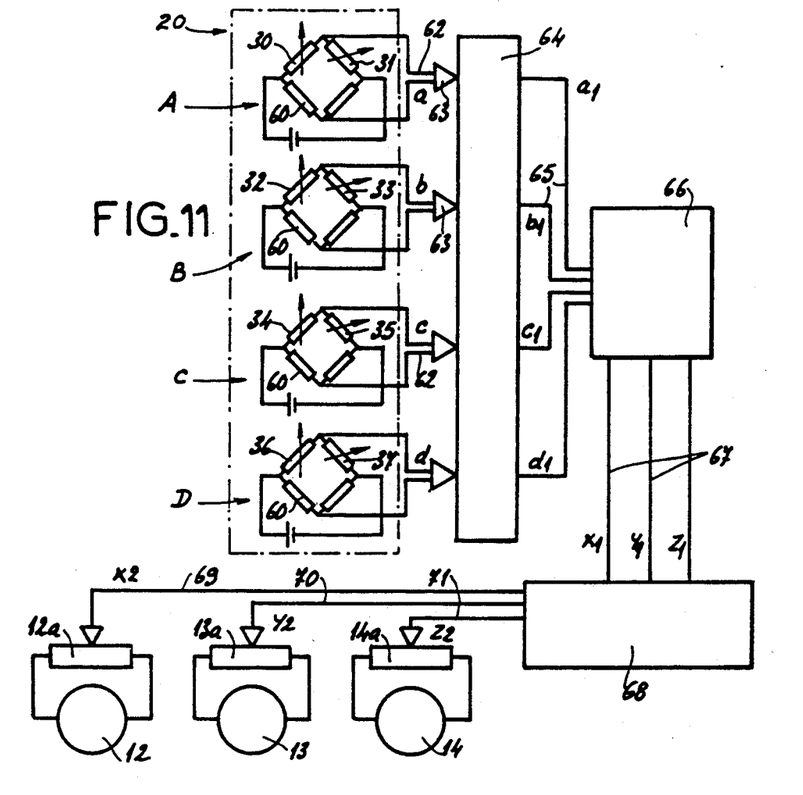
FIG. 11 is a simplified electrical diagram of the device according to the invention.

According to the invention, the control device which regulates the motorized displacements of the machine and intervenes in known fashion in supply circuits 12a, 13a and 14a of electric motors 12, 13 and 14, as shown in FIG. 11, comprises various means, including at least one control assembly 20 mounted on one of the elements of the machine.

In the embodiment shown in FIG. 1, control assembly 20, of which there is only one, is mounted laterally on the side of vertically movable slide 5.

Figure 2:
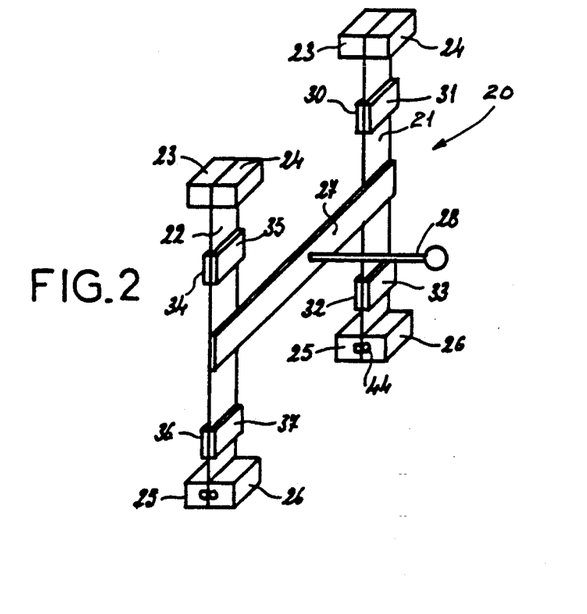
FIG. 2 is a partial perspective view showing, on an enlarged scale, the essential elements of a first embodiment of the control unit.
Figure 3:
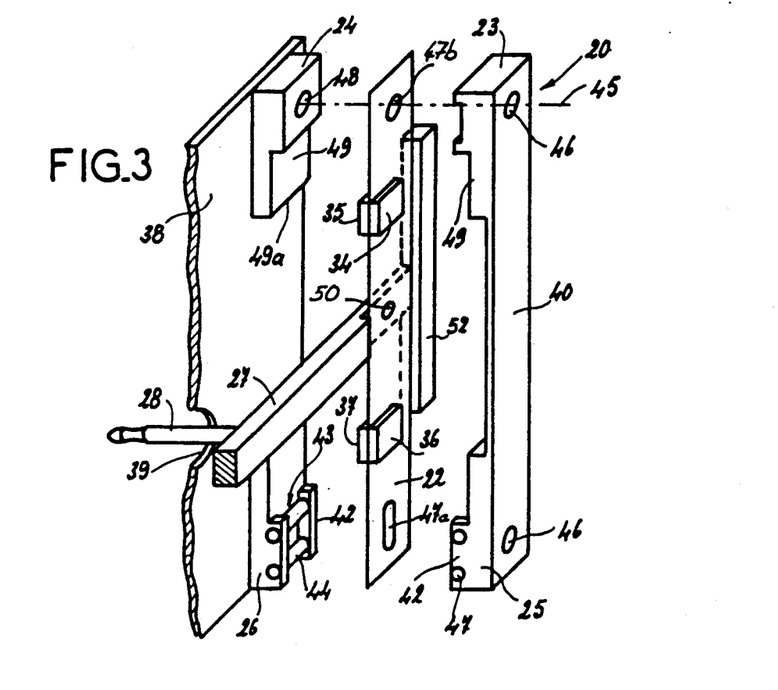
FIG. 3 is a perspective view, partially cut away, showing on an enlarged scale, the elements which make up the control unit of FIG. 2.

The control assembly 20, shown schematically in FIGS. 2 and 3, has two elastic strips 21 and 22, made of, for example, spring steel. The ends of each of these two strips 21, 22 are gripped between two pairs of jaws, i.e., one pair of upper jaws 23 and 24 ensuring locked engagement and one pair of lower jaws 25 and 26 providing sliding engagement to provide a degree of freedom which allows the strips to deform, and, in this case, permitting the longitudinal movements of the strip relative to the lower jaws.

As shown in FIG. 2, the wide sides of strips 21 and 22 are located in the same plane, vertical in this case as mounted on slide 5, with their longitudinal axes parallel and their inner sides spaced apart. The two strips are connected essentially at their middles by a rigid cross member 27 which is integral with an operating lever 28 projecting perpendicularly from one of its faces. Each strip 21, 22 is provided, near each end of cross member 27 and on each of its faces, with transducers. The latter are divided into four pairs. For strip 21 the transducer pairs are an upper pair 30–31 and a lower pair 32-33, and for strip 22, an upper pair 34–35 and a lower pair 36–37. The transducers can be composed of strain gauges or any other equivalent means capable of transforming a pulling force into electrical signals which can be processed.

FIG. 3 shows control assembly 20 in greater detail and which, for ease of representation, is seen from the rear. That is, it is shown after rotation through 180° relative to its representations in FIGS. 1 and 2. Further, FIG. 3 shows only strip 22. This figure shows that front jaws 24 and 26 are mounted on a plate 38 constituting the front wall of control assembly 20. In the central part of plate 38 is an opening 39 to allow lever 28 to pass through and provide clearance. Rear jaws 23 and 25 are connected together by a strip 40. Lower jaws 25 and 26, which are designed to allow sliding engagement of the lower end of strip 22, comprise two longitudinal edge ribs 42 delimiting a groove 43 between them. This groove serves to accommodate two transverse shoes 44 made of a material with a low coefficient of friction. The ends of these shoes are engaged in the corresponding recesses provided in edge ribs 42. It is evident that shoes 44 are located so as to be forward relative to the faces of ribs 42 so that they are the first to come in contact with the lower end of the strip.

The jaws and strips are connected together by transverse screws shown schematically by dot-dashed line 45, freely passing through holes 46 made in the rear jaws, and holes 47a, 47b made in the ends of the strip, and screwed into tapped holes 48 made in the front jaws.

FIG. 3 shows that lower hole 47a in the strip is oblong to give this strip the longitudinal freedom of movement.

Advantageously, the part of each jaw that comes below the strip is extended in the direction of the jaw located on the same side, by a step, designed generally by 49, whose function will be described below.

The connection between each strip 21 or 22 and the corresponding end of cross member 27 is provided by a screw passing through hole 50 in the strip to be received in cross member 27. FIG. 3 shows that cross member 27 is integral at each end, outside the corresponding strip, with a vertical bar 52 constituting stop means.

Figure 4:
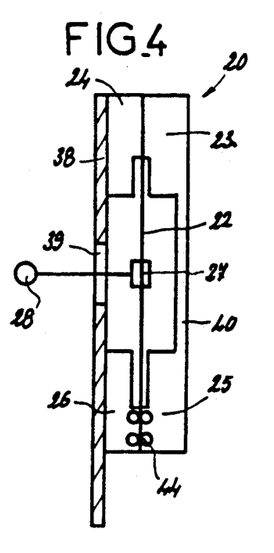
FIGS. 4, 5 and 6 are schematic side views of the control unit of FIG. 2 showing the various stop means associated with the strips when the latter are in the resting position, the position in which their resistance increases, and the speed limitation position, respectively.
Figure 8:
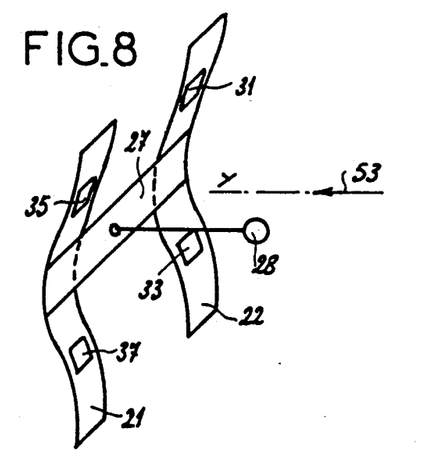
FIGS. 8, 9 and 10 show some of the positions which can be assumed by the strips of the first embodiment when they are deformed by the lever.
Figure 9:
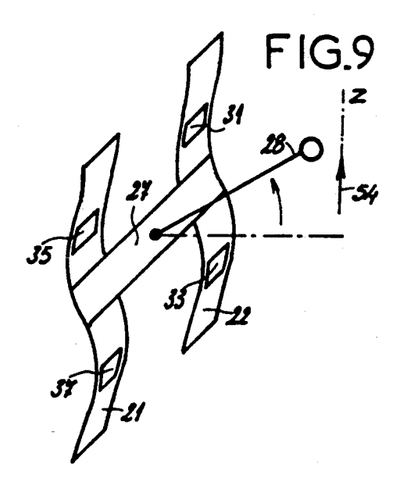
Figure 10:
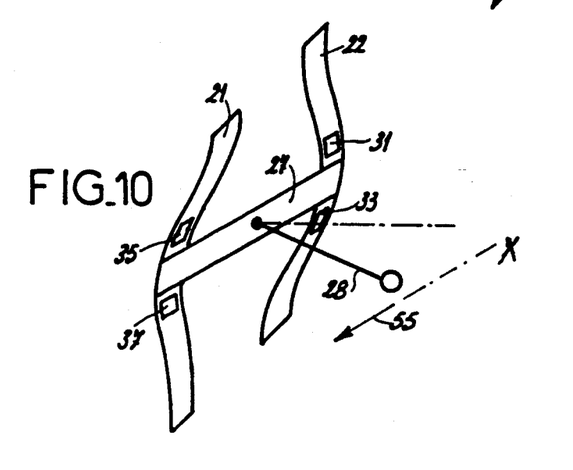

At rest, as shown in FIG. 4, elastic strips 21 and 22 are located in the same plane. Any force applied to lever 28 is transmitted to the two flexible strips which, as shown in FIGS. 8, 9 and 10 are deformed differently depending on the direction and orientation of the forces applied by the operator to the end of lever 28. Thus, in FIG. 8, corresponding to a wish on the part of the operator to move read head 7 only along the Y axis in the direction of arrow 53, the two strips 21 and 22 are curved symmetrically, with the convexities facing forward in the direction of desired movement. In FIG. 9, corresponding to the desire on the part of the operator to cause slide 5 to move upward, on the Z axis and in the direction of arrow 54, the displacement of the end of lever 28 causes a rotation of this lever, which, by means of cross member 27, gives the two strips 21 and 22 an S shape. In FIG. 10, corresponding to the wish to move column 4 along ruler 8, on the X axis and in the direction of arrow 55, the lever pivots, and, through cross member 27, causes the two strips 21 and 22 to bend in the opposite direction. It can be seen that the combination of the three movements confers different degrees of bending on strips 21 and 22, the bending being translated by the transducers into voltages with different values and directions.

It should be pointed out here that the operation of the lever, in the direction of the desired displacement or displacements, produces an instinctive control which does not disturb the operator who can thus concentrate his attention on the actual displacement of measuring head 7 and can control it perfectly. This advantage is very important because it allows displacements on the fly without any danger to head 7.

FIG. 11 shows the control device means which make it possible to employ these voltages to cause displacements of the structural elements of the machine. In this figure, where reference numerals 30 to 37 represent the transducers, it is shown that the sensors of each pair of sensors are arranged in parallel in two of the arms of a Wheatstone bridge designated by A, B, C or D.

The other two arms of each of the bridges are provided with resistors that have a fixed value and are generally designated by 60.

In known fashion, an amplifier 63 is connected to the output circuit 62 of each of the bridges. The four amplifiers 63, which deliver voltages with values a, b, c and d, are connected to an analog-digital converter 64 which transforms voltages a, b, c and d into four signals a1, b1, c1, and d1. The latter are conducted by connecting pathways 65 to a calculator 66. The calculator in turn is connected by three paths 67 to a digital-analog converter 68, from which emerge connections 69, 70 and 71 terminating in control circuits 12a, 13a and 14a of electric motors which ensure the displacement of the structure on axes X, Y and Z.

When the operator moves lever 28 to cause the controlled displacement of the structure of the machine, voltages a, b, c and d, as delivered by Wheatstone bridges A, B, C, and D, are amplified and then converted into digital signals a1, b1, c1 and d1 which are then processed by calculator 66. The latter performs algebraic processing according to the following three formulas:

$$(a1+b1+c1+d1), \quad 1$$

$$(-a1+b1-c1+d1), \quad 2$$

$$(-a1-b1+c1+d1) \quad 3$$

In other words the calculator transforms signals a1, b1, c1 and d1, with a value and sign defined by the sensors and coming from Wheatstone bridges A through D, into signals x1, y1 and z1, with signs and values defined for the three axes X, Y, and Z depending on the desired displacement of the structure along these three axes, as expressed by the operator through lever 28. The signals with values x1, y1 and z1 are converted by converter 68 into voltages x2, y2 and z2 which can be used directly by control circuits 12a to 14a of electric motors 12 to 14. Hence, each of the electric motors assumes a rotational direction and a speed relative to the position given by the operator to lever 28.

During the operation of the lever, as a result of the arrangement of the strips, the parasitic forces generated by the operator's hand, for example twisting movements, have little influence on the control means themselves which ensures that the desired results are constant.

The dimensions of the lever and its accessibility are such that fingertip guidance is possible.

In addition, the elastic strips are chosen so that low forces on the lever, for example from several newtons to ten newtons, will be sufficient to actuate the control means and thereby obtain structural displacements ranging from speeds of several millimeters per second to maximum speeds of 150 millimeters per second.

Figure 5:
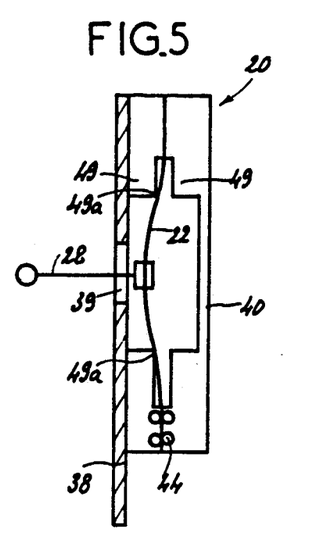

To facilitate speed control, and as shown in FIG. 5, when strips 21 or 22 achieve a certain degree of deformation, they come in contact with edge 49a of step 49 which changes their resistance. This increase in resistance alerts the operator's senses to the passage of a threshold. It also causes an increase in the stress perceived by the actuated sensors and, through the control device, causes a switch from a slow sensing speed to a fast approach speed or vice versa.

The sensitivity threshold informs the operator of the switch to fast speeds and therefore constitutes an automatic monitoring means which allows the operator to control the speed ranges and, in the sensing phase, to remain in low speed, which eliminates the dynamic efforts that result from rapid displacement and ensure that the desired measurement precision will be obtained.

Figure 7:
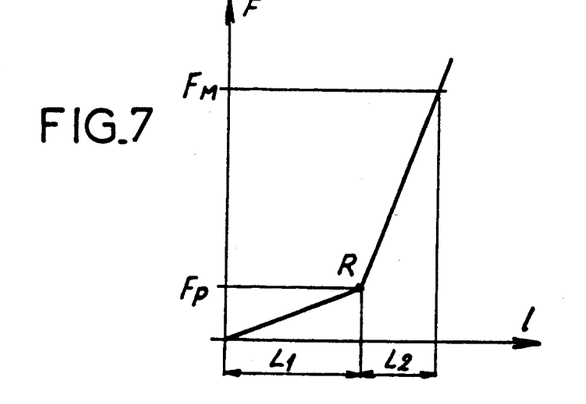
FIG. 7 is a graph showing the variation in the strip resistance as a function of the degree of deformation.

FIG. 7 shows that for a travel L1 between zero and two millimeters, the force Fp used to actuate the lever changes from zero to a value on the order of two to three newtons, corresponding to a sensing speed Vp that varies from a value of zero to a value on the order of eight millimeters per second. After passing point R, corresponding to an increase in the resistances of strips 21 and 22, a travel L2 which is less, for example on the order of one millimeter and a half, requires a great effort starting at Fp up to the value Fm, on the order of ten to fifteen newtons. In this phase, the device produces an increase in the displacement speed which can reach, for example, 150 millimeters per second, which is the maximum approach speed.

Figure 6:
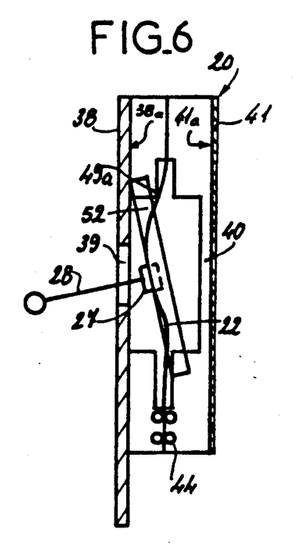

The limitation of the maximum speed, as well as the protection of the strips against excessive deformation, which could modify their characteristics, is ensured in very simple fashion as shown in FIG. 6 by having one end of each of bars 52 abut the inner surface of control assembly 20, namely face 38a of plate 38 in one direction and face 41a of a cap 41 in the other direction.

It follows from the above that the combination of control assembly 20, including elastic strips 21 and 22 and the pairs of transducers, with the specific wiring of Wheatstone bridges A to D, the processing means comprising converter 64, calculator 66, and converter 68 and with three processing formulas, make it possible to obtain a control device which provides instinctive displacements that are regulated in terms of speed, direction, and rotation that are perfectly defined and permit measurements on the fly without the structure of the machine being affected yet achieve the desired precision.

In addition, the flexibility of the device makes it possible to control the displacement of the machine with very little effort and without adversely influencing measurement.

Figure 12:
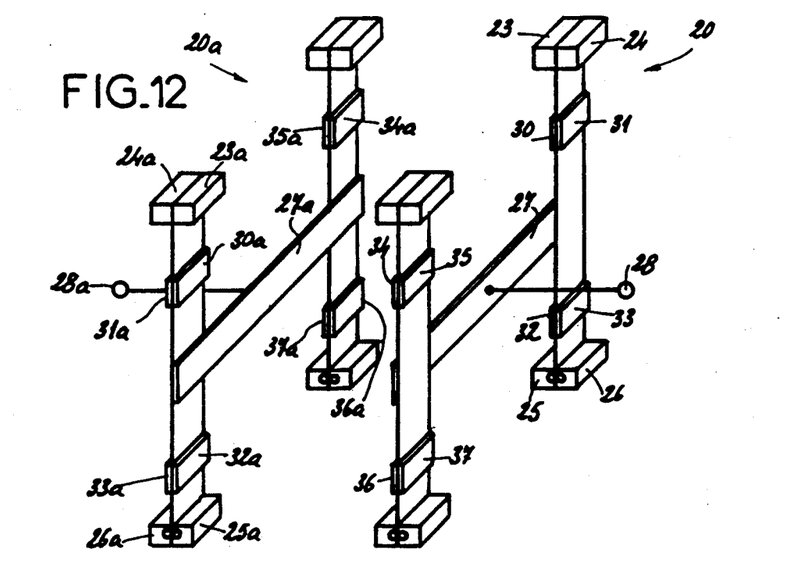
FIG. 12 is a partial perspective view of the flexible strips of two units located inside one control device.
Figure 13:
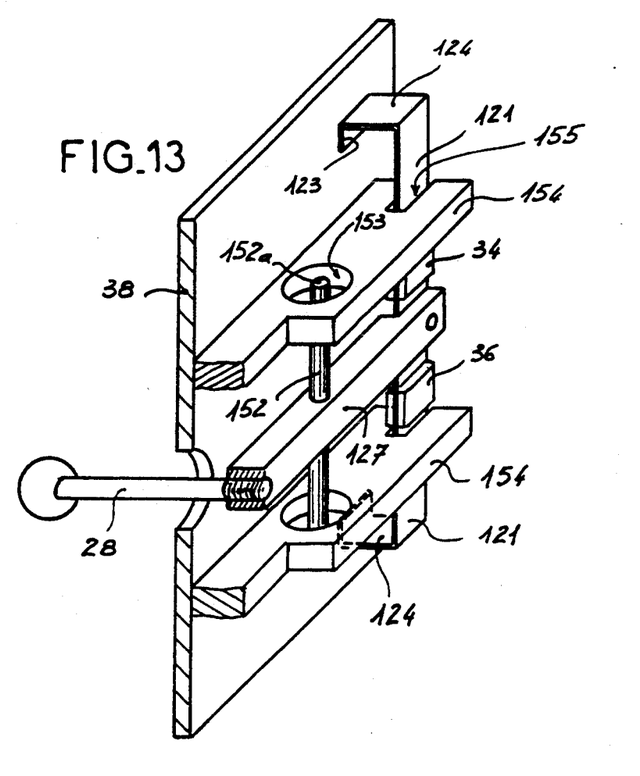
FIG. 13 is a perspective view, partially cut away, showing the elements which make up the control unit of a second embodiment.

The control assembly which has been described as a single control in the embodiment described above, can also be used with an identical assembly 20a located for example on the other side of slide 5. In this embodiment, shown in FIG. 12, the elements of the second control assembly 20a have the same reference numbers as the identical ones in assembly 20, with the letter "a" appended. The only difference consists in the mounting of bridges A to D since the pairs of sensors in assembly 20a are substituted for the fixed resistors 60 shown in FIG. 11. When installing two control assemblies 20 and 20a, the pairs of sensors constituting each bridge are selected which occupy spatially opposed positions, both vertically and transversely, in the two units. In other words, bridge A comprises pairs of sensors 30, 31 in control assembly 20 and pairs of sensors 33a, 32a in control assembly 20a; bridge B comprises paired sensor pairs 32, 33 and 31a, 30a; bridge C comprises paired sensor pairs 34, 35 and 37a, 36a; and bridge D comprises paired sensor pairs 36, 37 and 35a, 34a. Except for this difference in installation, the other means of the control device are identical to those in the previous embodiment, they function in the same way and provide the same results.

Figures 14, 15:
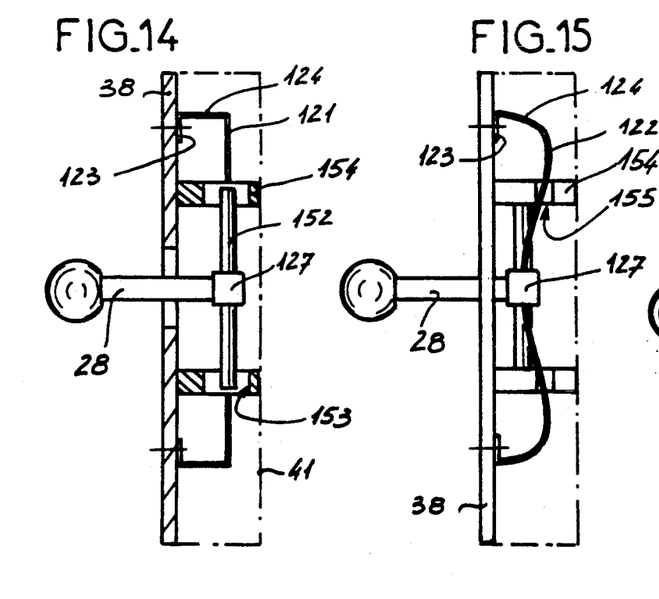
FIGS. 14 to 16 are schematic side views of the control unit of FIG. 13 showing the various stop means associated with the strip when the latter are in the resting position, the position in which their resistance increases, and the speed limitation position respectively.
Figure 16:
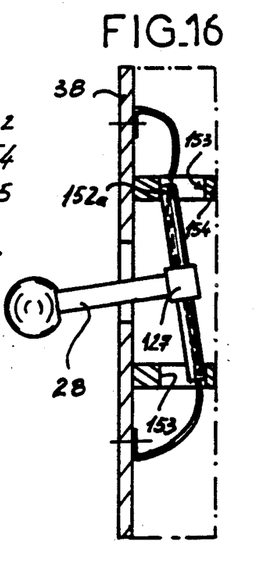

FIGS. 13 to 16 show a second embodiment of the control assembly in which the two elastic strips 121, 122 are connected to plate 38 directly by their curved and recurved ends. Each strip thus forms a partially closed U whose legs 123 are used for mounting, by means of screws or the like, and whose tops 124 ensure, as a result of their flexibility, a degree of longitudinal freedom that will allow deformations of the bodies of the strips 121 and 122. This makes it possible to eliminate the jaws, counterjaws, and shoes of the assembly shown in FIG. 3, and thus simplify the device, while making it possible to obtain the same deformations as shown in FIGS. 14 to 16.

In this embodiment, the strips, bearing sensors 30 to 37, are mounted on the ends of rigid cross member 127 which is integral with two bars 152. The latter are located between the point of attachment of lever 28 and the ends of the cross member 127. Ends 152a are located inside holes 153 which, being of a greater diameter than ends 152a, constitute stop faces, as shown in FIG. 16, and limit the movements of lever 28, and hence the deformation of the strips. Holes 153 are made in the transverse walls 154 that are integral with plate 38 and perpendicular thereto and to the direction of strips 121 and 122.

Each wall 154 has, at each end, a groove 155, giving it the shape of a fork, the groove 155 constituting a passageway for the corresponding strip body. As shown in FIG. 15, the opposing edges of groove 155 replace edges 49a of steps 49 in the previous embodiment. In other words, they constitute stop means which increase the stiffness of the strips to form the sensory threshold upon transition from low speed to high speed.

It follows from the above that this control assembly is much simpler than the previous one yet provides the same functions and results.

Of course, control assembly 20 can be mounted on any other element of the structure of the measuring machine, even on the base, or on an element or structure of any other machine.

Finally, the elastic strips can be associated with any other transducers or movement sensors, such as inductive or capacitive sensors, or may be replaced by any other means that convert the displacements into electrical voltages without departing from the invention, provided that the voltages delivered by control assembly 20 are processed algebraically and provide in the control circuits of motors 12 to 14 voltages that correspond in value and direction to the displacements transmitted to the lever in the three directions X, Y and Z.

What is claimed is:

1. A device for manually controlling displacement of a machine element in three dimensions defined by three orthogonal axes x, y and z, comprising:

a control assembly comprising a control unit having a top, a bottom and sides separating said top and said bottom, said top having an opening at a center portion thereof;

two deformable strips;

a rigid cross member attached proximate each end respectively to a mid-portion of one of said pair of deformable strips;

an operation lever mounted to a mid-point of said cross-member to extend out of said opening in said control unit;

a first jaw means associated with each deformable strip for holding a first end of said deformable strip and a second jaw means for holding a second end of said deformable strip, said first and second jaw means being mounted in said control unit;

two pairs of sensors mounted on each deformable strip, one pair mounted to each side of the attached cross member, the sensors of each pair being mounted on opposite surfaces of the deformable strip, each said pair of sensors being wired in parallel to form two arms of a Wheatstone bridge to convert deformation of said strips, resulting from movement of said lever, into first voltages a, b, c or d;

a processing means electronically connected to said Wheatstone bridges to convert said first voltages according to the following formulas:

$$(a+b+c+d), \quad 1$$

$$(-a+b-c+d), \quad 2 \text{ and}$$

$$(-a-b+c+d) \quad 3$$

into three second voltages x2, y2, z2 that are fed to three motors respectively for displacing the machine element in correspondence with movements of said lever in said three orthogonal axes.

2. The device according to claim 1, wherein the processing means for first voltages a, b, c and d further comprises an analog-digital converter which transforms said first voltages into first digital signals, a1, b1, c1 and d1 respectively, a calculator that algebraically processes the digital signals according to the following three formulas:

$$(a1+b1+c1+d1) \quad 1$$

$$(a1+b1-c1+d1) \quad 2$$

$$(-a1-b1+c1+d1) \quad 3$$

to deliver three second digital signals x1, y1 and z1 which correspond in value and direction to displacements transmitted to said lever in the three orthogonal axes, and a digital-analog converter for transforming the three second digital signals into said second voltages x2, y2, and z2 which is located between said calculator and control circuits of said electric motors for displacement of the machine element.

3. The device according to claim 1, further comprising a second control assembly, wherein eight pairs of sensors are powered through four Wheatstone bridges with the sensors of one pair from each control assembly arranged in parallel in two of the arms of one of the Wheatstone bridges, and the pair of sensors connected to each Wheatstone bridge from each of the two control assemblies has respective positions on the deformable strips of the two control assemblies which are spatially opposed both vertically and transversely.

4. The device according to claim 1, wherein each of said deformable strips is mounted in said control assembly by engagement with said first and second jaw means in such a manner that at least one of the mounted ends of each said deformable strip possesses a degree of freedom which allows said deformable strip to bend.

5. The device according to claim 4, wherein the degree of freedom of each strip is provided by slide mounting one of its ends between two opposing jaws of said second jaw means, each said jaw abutting said end by means of at least one shoe made of a material with a low coefficient of friction, said shoe being positioned transversely in a longitudinal groove in each said jaw.

6. The device according to claim 4, wherein the control assembly further comprises stop means cooperating with each said deformable strip for increasing resistance and forming a sensory threshold beyond which the rates of displacement of the elements of the structure switch from a slow sensing speed range to a rapid approach speed range when said deformable strips pass a deformation threshold.

7. The device according to claim 6, wherein each jaw is extended on a side below said deformable strip by a step of less height than said jaw and whose edge constitutes a stop for increasing resistance of the strip.

8. The device according to claim 4, further comprising a stop bar integral with each end of said rigid cross member for coming in contact with opposite stop faces of said control assembly following deformation of said deformable strips to thereby limit the deformation.

9. The device according to claim 8, wherein each said deformable strip is provided at its ends with a bent top giving the deformable strip a degree of freedom in longitudinal translation and permitting the deformable strip to bend, said bent top being extended by a recurved leg to hold it on a support plate comprising said top of said control unit.

10. The device according to claim 9, wherein said stop faces cooperating with said stop bars to limit the displacement of said deformable strips comprise inner surfaces of two holes made in each of two walls which project from said support plate, said two walls are arranged in parallel and parallel to said cross member, and each said wall is provided at each end with a slot within which a body of said deformable strip is seated such that opposite edges of said slot constitute stops for increasing a resistance of said deformable strip.

11. The device according to claim 2, further comprising a stop bar integral with each end of said rigid cross member for coming in contact with opposite stop faces of said control assembly following deformation of said deformable strips to thereby limit the deformation.

12. The device according to claim 11, wherein each said deformable strip is provided at its ends with a bent top giving the deformable strip a degree of freedom in longitudinal translation and permitting the deformable strip to bend, said bent top being extended by a recurved leg to hold it on a support plate comprising said top of said control unit.

13. The device according to claim 12, wherein said stop faces cooperating with said stop bars to limit the displacement of said deformable strips comprise inner surfaces of two holes made in each of two walls which project from said support plate, said two walls are arranged in parallel and parallel to said cross member, and each said wall is provided at each end with a slot within which a body of said deformable strip is seated such that opposite edges of said slot constitute stops for increasing a resistance of said deformable strip.

* * * * *